US010380141B1

United States Patent
Chepel et al.

(10) Patent No.: US 10,380,141 B1
(45) Date of Patent: Aug. 13, 2019

(54) FAST INCREMENTAL BACKUP METHOD AND SYSTEM

(71) Applicant: Acronis International GmbH, Shaffhausen (CH)

(72) Inventors: Dmitry Chepel, Moscow (RU); Yuri Per, Dolgoprudny (RU); Serguei M. Beloussov, Costa Del Sol (SG); Stanislav Protasov, Moscow (RU); Maxim V. Lyadvinsky, Moscow (RU)

(73) Assignee: ACRONIS INTERNATIONAL GMBH (CH)

( * ) Notice: Subject to any disclaimer, the term of this patent is extended or adjusted under 35 U.S.C. 154(b) by 604 days.

(21) Appl. No.: 14/870,452

(22) Filed: Sep. 30, 2015

Related U.S. Application Data (60) Provisional application No. 62/057,849, filed on Sep. 30, 2014.

(51) Int. Cl.
 *G06F 16/27* (2019.01)
 *G06F 11/14* (2006.01)
(52) U.S. Cl.
 CPC ........ *G06F 16/273* (2019.01); *G06F 11/1451* (2013.01); *G06F 16/275* (2019.01); *G06F 2201/835* (2013.01)
(58) Field of Classification Search
 CPC . G06F 17/30578; G06F 16/273; G06F 16/275
 USPC .......................................................... 707/618
 See application file for complete search history.

(56) References Cited

U.S. PATENT DOCUMENTS

| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |
| 7,603,533 | B1 | 10/2009 | Tsypliaev et al. |
| 7,636,824 | B1 | 12/2009 | Tormasov |
| 7,650,473 | B1 | 1/2010 | Tormasov et al. |
| 7,721,138 | B1 | 5/2010 | Lyadvinsky et al. |
| 7,779,221 | B1 | 8/2010 | Tormasov et al. |
| 7,831,789 | B1* | 11/2010 | Per ...................... G06F 11/1451 707/625 |
| 7,886,120 | B1 | 2/2011 | Tormasov |
| 7,895,403 | B1 | 2/2011 | Tormasov et al. |

(Continued)

*Primary Examiner* — Shahid A Alam
(74) *Attorney, Agent, or Firm* — K&L Gates LLP (57) ABSTRACT

Various embodiments are directed to systems and methods for creating an archive of a set of logical storage units stored on at least one storage medium. A first plurality of LSU descriptors may be generated. Each LSU descriptor may describe a current version of one of the set of LSUs at about the time of the generating. A first archive may be read to produce a first archive plurality of LSU descriptors. Each of the first archive plurality of LSU descriptors may describe a version of one of the set of LSUs when the first archive was created. The first archive plurality of LSU descriptors may be compared with the first plurality of LSU descriptors to identify a first LSU from the set of LSUs that has an associated LSU descriptor that does not match a corresponding LSU descriptor from the first archive plurality of LSU descriptors.

9 Claims, 8 Drawing Sheets

(56) References Cited

U.S. PATENT DOCUMENTS

| | | |
|---|---|---|
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 2006/0225065 A1 | 10/2006 | Chandhok et al. |
| 2010/0011178 A1 | 1/2010 | Feathergill |

\* cited by examiner

FAST INCREMENTAL BACKUP METHOD AND SYSTEM

CROSS-REFERENCE TO RELATED APPLICATIONS

This application claims priority to and the benefit of U.S. provisional patent application No. 62/057,849, filed on Sep. 30, 2014, the disclosure of which is herein incorporated by reference in its entirety.

FIELD

The present invention relates to archiving and copying of data, and more particularly, to archiving of hard disk drive (HDD) data at various predetermined points in time.

BACKGROUND

Currently, there are a number of conventional methods that relate to organization of data archiving. One of these is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive is archived, or stored somewhere once. After that, only that data that has been changed, or added, since the previous backup, or since the pervious incremental backup, is actually archived. Recovery of data from the archive typically involves merging of the original backup and the various incremental backups.

There are generally two conventional approaches to implementing the incremental backup. One approach is to archive data in the form of logical structures, such as files. The second approach is to preserve the physical structures as they are represented on a storage medium. In other words, in the second case, sectors, clusters, and other physical data blocks are archived.

Despite the fact that incremental backup on a logical level makes it easier to identify data that is subject to archiving, in a number of situations, this approach is unacceptable. For example, backup on a physical level provides an ability to restore the functionality of the computing system, since it is possible to restore hidden and otherwise unmovable data blocks, for example, hidden and system areas of the disk, including boot areas.

At the same time, incremental backup on a physical level requires identifying the blocks that are subject to archiving, in other words, identifying blocks whose content did not change since the prior archiving operation. When data block level comparison level is used, this task requires a considerable time and CPU resources, both for data block comparison and for extraction of previously archived data blocks from the archive.

Accordingly, there is a need in the art for an effective and efficient method of identifying data blocks that are not subject to archiving, which minimal time and effort.

SUMMARY

Accordingly, the present invention is related to a fast incremental backup method and system that substantially obviates one or more of the disadvantages of the related art.

In one aspect, there is provided a method of incremental backup of a storage device, including (a) selecting an area of the storage device for backup; (b) reading descriptors of logical storage units of the selected area; (c) comparing the descriptors of the logical storage units of the selected area with descriptors of already archived logical storage units; (d) for physical storage units of logical storage units of the selected area whose descriptors are not identical to the descriptors of the archived logical storage units, checking if these physical storage units need to be backed up; and (e) backing up contents of physical storage units identified in step (d).

The logical storage units can be files. The comparison step can be, e.g., (1) bit-wise comparison of the logical blocks, (2) comparing control sums of the logical blocks, and (3) comparing log files relating to the logical storage units. The physical storage units can be blocks. The descriptors can be, e.g., MFT entries, hash function values, timestamps, checksums, and file metadata. The descriptors can be compared on a physical storage unit basis. The method can optionally include generating a bitmap of the physical storage units of the storage device; marking, in the bitmap, those physical storage units that correspond to logical storage units with different descriptors; and archiving content of the physical storage units marked in the bitmap. The method can optionally include archiving logical storage units of the storage device having the same name as corresponding archived logical storage units of the storage device, but different time stamps.

Various embodiments are directed to methods and systems for creating a file-level archive of a set of files stored on at least one storage medium. A first archive of the storage medium may be generated. The first archive of the storage medium may comprise a copy of each file from the set of files and a plurality of archive descriptors such as hashed file descriptors. Each hashed file descriptor may describe a version of one of the set of files when the first archive is created. After generating the first archive, a second plurality of hashed file descriptors may be generated, where each hashed file descriptor of the second plurality of hashed file descriptors describes a version of one of the set of files at a point in time after the first archive is created. The first plurality of hashed file descriptors may be read from the first archive and compared to the second plurality of hashed file descriptors. Considering the comparing, a subset of the set of files is identified where each file in the subset of files has a hashed descriptor at the first archive that does not match a corresponding hashed descriptor from the second plurality of hashed file descriptors. A second archive of the set of files may be generated, where the second archive comprises at least a portion of the subset of files and the second plurality of hashed file descriptors.

Various embodiments are directed to systems and methods for creating a logical storage unit-level archive of a set of logical storage units stored on at least one storage medium. A first plurality of LSU descriptors may be generated. Each LSU descriptor from the first plurality of LSU descriptors may describe a current version of one of the set of LSUs at about the time of the generating. A first archive may be read to produce a first archive plurality of LSU descriptors. Each of the first archive plurality of LSU descriptors may describe a version of one of the set of LSUs when the first archive was created. The first archive plurality of LSU descriptors may be compared with the first plurality of LSU descriptors to identify a first LSU from the set of LSUs that has an associated LSU descriptor from the first plurality of LSU descriptors that does not match a corresponding LSU descriptor from the first archive plurality of LSU descriptors. A second archive of the set of LSUs may be created. The second archive may comprise the first file and the first plurality of LSU descriptors.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are example and explanatory and are intended to provide further explanation of the invention as claimed.

FIGURES

The accompanying drawings, which are included to provide a further understanding of the invention and are incorporated in and constitute a part of this specification, illustrate embodiments of the invention and together with the description serve to explain the principles of the invention.

In the drawings.

DESCRIPTION

Reference will now be made in detail to the embodiments of the present invention, examples of which are illustrated in the accompanying drawings.

In order to make the archiving process more efficient, it is proposed to form a backup on a physical level, and in addition, to use information that characterizes the logical structure of the data storage device, such as a hard disk drive.

It should be noted that this approach, in some cases, does not always identify every single data block that is not subject to archiving. However, the proposed method, with a minimal expenditure of time and resources, provides for a guaranteed exclusion of a substantial majority of the blocks from archiving of those blocks that do not need to be archived. Subsequently, for those blocks were not excluded from archiving, and are therefore subject to archiving, it is possible to use traditional methods and other suggested mechanisms to further reduce the number of data blocks that are actually subject to archiving.

In order to implement the proposed methods, the following steps are utilized:

First, on a physical level, a complete (or partial) snapshot of the storage medium is formed, and a time stamp of the snapshot is recorded (although it is also possible to work without a time stamp, by using other descriptors, such as hash functions, discussed below, file metadata, file names, MFT contents, etc.). For example, the storage medium may be selected by an administrator or selected automatically, and a selection of the storage medium may be received. The storage medium may be at least one of a drive (e.g., hard drive), a partition, or a network share, but this is not intended to be a limitation of the present disclosure and various other storage mediums may be included in the systems and methods described herein. When a second archiving operation is performed, a bitmap of the data blocks of the hard disk drive is formed. For example, this can be a bitmap of data blocks that are subject to archiving, or a bitmap of used data blocks of the hard disk drive (i.e., blocks of the hard disk drive that contain useful data, rather than "empty" blocks, or free blocks).

During subsequent archiving of the hard disk drive, a comparison of the description of the logical structures of the drives is performed. This comparison characterizes the distribution of the data of the logical structures into data blocks. If the logical structures (including the addresses of the blocks) correspond to each other, the data blocks that are occupied by the corresponding logical structures are identified, and for these blocks, the corresponding bit in the bitmap is cleared.

At the same time, it is also possible to retain, in the incremental snapshots, those blocks that were previously archived. However, a substantial increase in the speed of identifying the blocks that do not need to be archived compensates for this. If it is necessary to reduce the downtime of the computing system or server, the advantages of the above approach are fairly substantial. In other words, comparing the time needed for a full backup with the time necessary for a bit-wise comparison of the data block's content (given the necessity of unarchiving of the contents of one or more copies of the data, and the time necessary to implement a single backup in the proposed approach), the advantages of the proposed approach are self-evident.

Note that logs or change journal entries can be used to at least partially exclude various logical structures from the analysis. In other words, the fact that journal entries exist in the logs means that some changes have been made to the data in the blocks or files, and, therefore, they do need to be backed up without further checks. In such a way those physical storage units may be excluded from the selected area, or may be included in the selected area if only some blocks of those files may be modified A file system may organize logical storage units, such as files, directories, folders, etc. on a physical storage device. For example, a file system may maintain correlations between logical storage units and corresponding physical storage units. For example, applications may request a particular file or other logical storage unit for either read or write access. A request for read access may be called a read request; a request for write access may be called a write request. An operating system may receive read and write requests and may forward the same to the file system. The file system may find the physical storage units including the requested data and return the requested data to the requesting applications, for example, via the operating system. Many file systems maintain metadata describing the logical storage units on a volume. For example, the NTFS file system creates and maintains a Master File Table or MFT and associated log file that records file transaction information and implements file system recoverability. Further, for example, the selected storage medium as discussed above may include a file system which supports a metadata format, including but not limited to MFT or inodes. Because the log file is a system file, it can be found early in the boot process and used to recover the disk volume, if necessary. When a user updates a file, a Log File Service records all metadata redo and undo information for the transaction. For recoverability, "redo" information in the log file allows NTFS to roll the transaction forward (repeat the transaction if necessary), and "undo" allows NTFS to roll the transaction back, if an error occurs.

Figure 5:
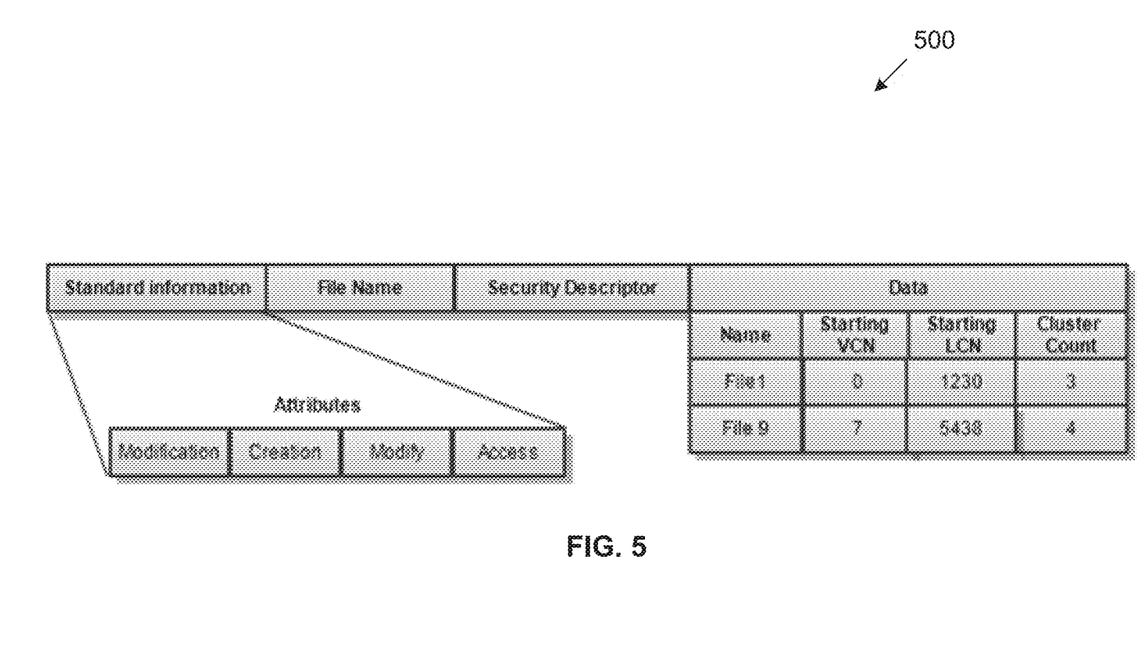
FIG. 5 is a schematic diagram of an example log file.

FIG. 5 is a schematic diagram of an example log file 500. The log file may be a Master File Table or any other similar type of log file. As described above, log file 500 may comprise various entries describing subject files including, for example, a File Name indicating a logical name of the subject file and other Standard Information about the subject file. The Standard Information may include, for example, timestamps indicating the timing of various actions performed on the subject files. An Entry Modified timestamp also known as a Change timestamp may indicate the time of the most recent modification to file metadata. A Creation timestamp may indicate the time when a given file's content is modified. A Modify timestamp may indicate a most recent time that the respective files were modified. An Access timestamp may indicate the most recent time that the respective files were accessed. The log file 500 may also comprise a Security Descriptor indicating security properties associated with the respective files. For example, some files may be accessible at different levels to different users or different categories of users. In the log file 500, the Standard Information, File Name and Security Descriptor columns are provided as examples. Specific data describing specific example files is not provided under these columns.

The log file 500 may also comprise a Data entry comprising metadata that describes where physical data units making up the various files are stored. For example, a Name column indicates file names (File 1 and File 9 in illustrated example). A Starting VCN indicates the virtual cluster number where the file starts. The VCN indicates a cluster number relative to the beginning of a logical data unit. For example, in the NTFS file system and other file systems that support streams, the VCN may indicate the offset in clusters between the beginning of a file system file and the beginning of the stream containing the indicated logical file. A starting LCN may be a logic cluster number indicating an offset in clusters between the beginning of a file and the beginning of a volume on which the file is stored. A Cluster Count may indicate the number of clusters making up a file. In some examples, the clusters indicated by the VCN, LCN and Cluster Count may be physical storage units on a physical device. In other examples, however, the clusters may be logical units abstracted from physical storage units.

The infinite log file: the log file is a circularly reused file. When a new record is added, it is appended to the end of the file. When the log file reaches its capacity, the Log File Service waits for writes to occur and frees space for new entries. As may be seen from the above, the log file retains a description of only the latest transactions, which means that it can only be used as an auxiliary source of information, since it does not provide a guarantee of a consistent backup. Following that logic, by using the bitmap, it is possible to archive the marked blocks, in addition to a previously created archive.

Due to the fact that the file description is also subject to archiving, the modification of the bitmap and the archiving can take place simultaneously. For example, it is possible to archive MFT blocks simultaneously with verification of identity of the file structures of the archive blocks. Identical blocks of the original MFT and the current MFT are not archived. At the same time, in some cases, the identity of the blocks frequently is due to the identity of the corresponding files, although it is not a guarantee of that.

For files with distributed blocks, for example, in logical structures described by FAT16 and FAT32, the proposed method of backup organization also permits to considerably shorten the time necessary for checking of data blocks of the files. This is due to the fact that some of the files are excluded from this process, without any further need for subsequent checking of data block identity. In some cases, when the data block address is changed (for example, due to defragmentation process), it is possible to also change the address of the original cluster, as well as subsequent clusters. If this is done, no subsequent checking of the data blocks needs to be performed, which reduces the volume of computation necessary for the archiving, compared to a block by block comparison of the contents of the hard disk drive.

In some cases, it is possible to use a comparison of used blocks bitmap with current and previously stored states of the hard disk drive. In this case, blocks that were previously free are excluded from consideration, and are archived without any further examination of the contents of the data blocks.

In another case, the description of the logical structures can be compared not directly, but through a creation of additional data structures, and subsequent comparison of such data structures. For example, when forming a snapshot of logical structure descriptions, it is possible to convert them by, for example, using various transforming functions, such as hash functions. Hash functions are one example of algorithms that transform a string of bytes into a usually shorter value of a fixed length, that represents the original string. This is called a hash value. When hashing a data block, or a file, the contents are converted into a short bit string—a hash value—and it impossible to recover the original message from the hash value. A hash value is unique in the sense that two different files cannot result in the same bit. Therefore, only the values of the hash functions need to be preserved, and can be stored together with, or added to, the snapshot.

In order to determine the identity of the logical structures, the hash functions of the descriptors can be compared, as well as the hash functions of the descriptors of the current state of the hard disk drive. Also, in one embodiment, bit-wise comparison of the hash functions can be performed.

Depending on the length of the key that is generated by the hash operation, some other mechanisms may be added to verify blocks that should or should not be subject to archiving.

In fact, relatively short hash values may be generated and compared fairly rapidly. If hash values being compared are different, it shows that the hashed contents are different too. However, using a short hash key results in a non-zero probability that different contents may have the same hash function value. For example, if maximum hash function value is less then number of different data blocks (here, groups of physical storage units), different data blocks can have the same hash function. Therefore, when a possibility of omitting data required for archiving needs to be reduced to zero value, additional operation of comparing blocks with the same hash function values may be implemented to prove that the data blocks at issue really are the same.

If the hash key length is relatively long, this gives an acceptable guarantee that the data block with the same hash values are in fact the same, e.g., the MD5 function gives about 10.sup.37 different keys, and no additional comparing of data blocks with the same hash values required. In this case, however, physical storage units from data blocks with different hash values may be compared to exclude additional storage units from archiving, e.g., for saving archiving storage space.

The advantage of using hash value comparison is in that, first, it speeds up the comparison process, since the value of the hash function is much less in size than the data itself, and, second it permits simplification of comparison of fragmented data. In disk drive terminology, "structure(s)" may be used that emulates a tree structure with a set of linked nodes. Each node has zero or more child nodes, which are below it in the tree. A node that has a child is called the child's parent node. A child has at most one parent; a node without a parent is called the root node (or "root"). Usually a placeholder for storing root information concerning the file is fixed in length. In such cases, when the file descriptor has more bytes than the placeholder can hold, links or pointers to blocks that contain additional information are used. Such structures (leaf nodes) may be physically stored away from the root node, may be fragmented or may be changed without modifying the contents of the file, e.g., while changing long file name only. For example, descriptors of files, e.g., inodes, which can have links to indirect blocks and remote inodes in this case, the inodes are hashed, together with the indirect blocks, which permits a rapid comparison of the hash function values and also permits grouping of fragmented data sets.

In one example, for structures described in FAT16 and FAT32 with a possibility of file fragmentation, a significant characteristic of their logical structure description is not only the file length and the address of the first data block, but also the location of all the blocks of the file. This information can be extracted sequentially for all the blocks of the file, and hashed together with the hashing of the FAT. This approach can also be used in NTFS, to verify B-trees.

To implement the method, it is possible to use various approaches that suspend disk operations during the time that the archive is being formed. Single threaded run mode or single threaded disk access can be used. This can be accomplished by an operating system that maintains a single-threaded environment or by one that provides file system locking, and hence allows exclusive access. For example, the MS-DOS operating system provides exclusive file access because it is a single-threaded environment, at least from an application program's perspective. A Linux (or another UNIX-like) operating system can be used, utilizing system locks to provide exclusive access. While the Windows operating systems are multi-threaded, they can defer to MS-DOS, Linux or another single-threaded environment. An archiving program according to the invention can begin execution in these multi-threaded environments, and then can pass control to a code that runs in DOS or Linux mode and thus provides exclusive disk access. Some operating systems also provide locks that ensure exclusive disk access.

Also, when practicing the method described above, the freezing, or suspension, of disk access can be replaced with other mechanisms for preserving the contents of the hard disk drive at the moment when the backup process begins. For example, it is possible to create an additional data structure that includes the contents of the data blocks as described in co-pending application Ser. No. 11/016,727, entitled System and Method for Incremental Backup of Local Drive Data, filed on Dec. 21, 2004, which is incorporated herein by reference in its entirety. Subsequently, this structure can be used as part of the incremental backup, or, alternatively, the contents of the data blocks can be moved into an incremental backup after checking it for necessity of archiving these blocks.

As yet another alternative, data that is subject to being written to the hard disk drive can be stored in some temporary data storage, with subsequent copying to the hard disk drive, once the formation of the incremental snapshot is completed.

From the perspective of the method described above, it is not critical exactly how files are organized into a logical structure, since the primary concern is how the file is described, rather than its location in the logical hierarchy. In other words, to establish identity of descriptions, it is possible to merely compare relevant file attributes. For instance, it is possible to compare the dates of changes to file contents, and ignore the dates of renaming of files, if the operating system permits this. Also, for files stored on a disk, it is possible to examine hash value functions of the file contents (e.g., MD 5 and SHA-1, which are two commonly used hash functions) and in the future, these values can be used for a preliminary analysis after identity is established based on file hashes and file descriptions. A more detailed comparison can then be made.

Note that the method described above is particularly applicable to file systems with contiguously arranged data blocks, for example, NTFS.

Since the file descriptions are used in formation of the backup, upon user request, some of the files can be excluded from the archiving process. Examples of data that may not be subject to backup include various swap and paging structures, temporary files, and various other files, as identified by the user. If identity is not determined it is possible to perform an additional check as to the reasons for why identity is not established. For example, if the file contains additional characteristics or metadata, which leads not to a change but to addition of other blocks to the file or, more commonly, to the file descriptor, (for example, the appearance of new data streams), the bitmap needs only to reset the bits that correspond to newer blocks of the file.

As another example, additions can be performed, and if no identity of the contents exists, the corresponding blocks are always archived.

Additionally, to avoid the necessity of copying of identical data blocks into the incremental backup, it is possible to have a second step in the verification of identity of the blocks. In this secondary verification, the contents of the blocks that were previously identified as not subject to archiving is compared. At the same time, the contents of the blocks that were identified in a log file need not be checked for whether they need to be archived.

In the case of the second step discussed above, blocks and/or clusters are grouped in some predetermined manner, and for these grouped blocks, hashes are generated, which are then compared. If the hashes are identical, the corresponding blocks are marked as not subject to archiving. If the hashes are not identical, additional verification checks of some of the blocks can be performed, for example, on a cluster by cluster basis.

The proposed method can also be used with generic file systems, such as ReiserFS, ext3, XFS, JFS and XenFS.

When a file is being moved form one folder to another, which only affects the entry in the MFT, the backup need not be made of the data, but only the MFT needs to be backed up, and the corresponding entries and descriptors of the file.

Since the MFT is approximately 10% of the hard disk drive or a partition, the volume of the data that is being compared or restored from a prior snapshot is significantly less compared to the entire drive. Only those blocks whose data has not been changed are not backed up. Therefore, some of the blocks in the incremental backup may be "extra."

Figure 1:
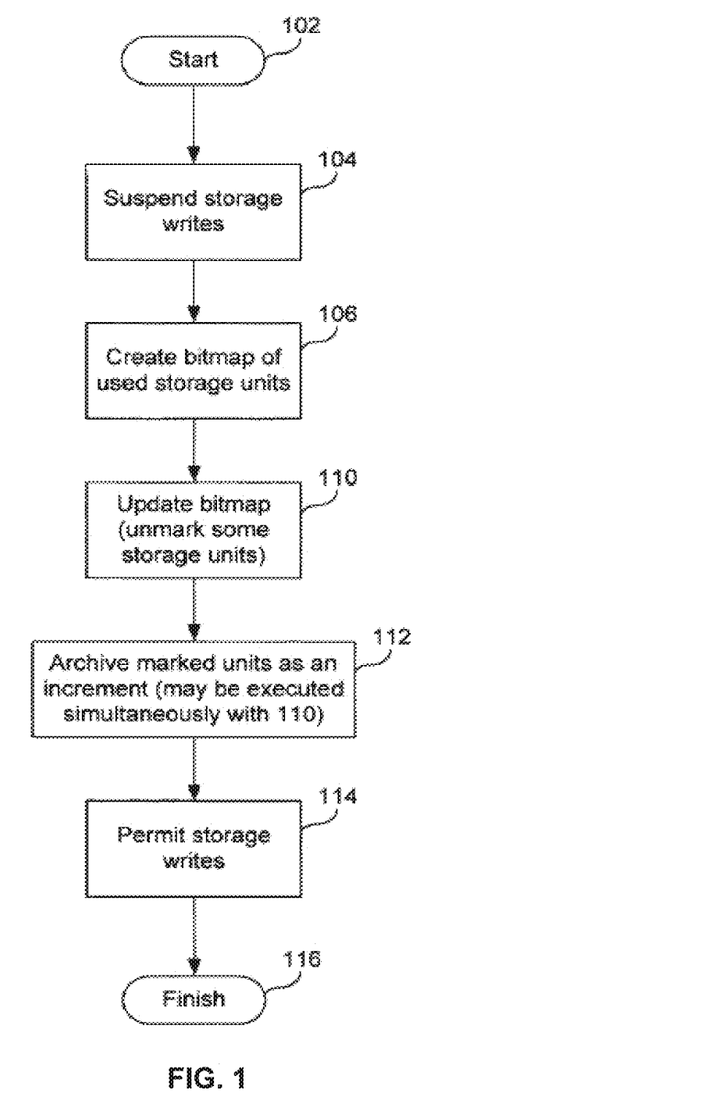
FIG. 1 illustrates one general example method of the present invention.

FIG. 1 illustrates one example method of the present invention. As shown in FIG. 1, after starting the archiving process (step 102), storage writes are suspended (step 104). A bitmap of used storage units (i.e., blocks or clusters or sectors) is created (step 106). In step 110, the bitmap is updated by unmarking some of the storage units that are not subject of incremental backup. Such storage units are, for example, physical blocks or clusters of storage device related to logical storage units with coincident descriptors. Also, other mechanisms of identifying physical storage units that should not be subject of archiving may be implemented, as discussed below. In step 112, units that are marked are archived as part of the incremental backup. This step may be executed simultaneously with step 110. In step 114, storage writes are again permitted, and the process finishes in step 116.

Figure 2:
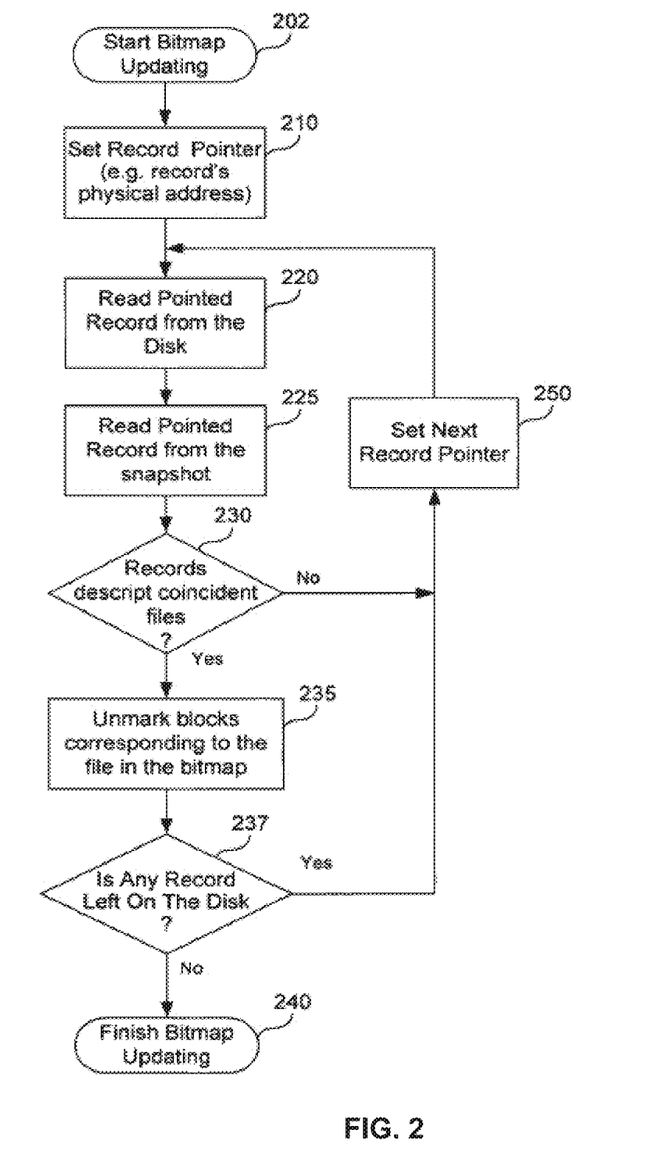
FIG. 2 illustrates identification of physical storage units that should not be subject of incremental backup.

FIG. 2 illustrates identification of physical storage units that should not be subject of incremental backup being described in a particular implementation of bitmap updating algorithm shown in FIG. 1 as step 110. In step 202, the bitmap updating process begins. It should be noted that the steps in FIG. 2 are described using records as examples. Such records store information that characterizes logical storage units. Examples of records may be physical storage blocks, or parts of MFT file that contains descriptors of files, or inodes, or other similar data objects. Commonly, descriptors of files are stored in the designated disk area, and logical descriptors are stored in the same blocks, if the descriptor is not changed. In this a case, the simplest way of comparing descriptors is comparing records, represented by the physical storage blocks of the designated area. The task of counting records involves, for example, consecutively incrementing designated block addresses and comparing contents of blocks with the same addresses that have been read from the storage device vs. those extracted from the previous backup structure. A direct comparison of corresponding blocks' content may be replaced with comparing hash function values, calculated for those blocks, or by any other appropriate method. For example, metadata records maybe read where each record corresponds to one of a plurality of files, and a hash for each metadata record may be calculated.

In step 210, the record pointer (e.g., address of an initial storage block) is set, in other words, the records physical address is identified. In step 220, the record to which the pointer points to is read from the disk. In step 225, the record to which the pointer points to is read from the snapshot. In step 230, comparing of descriptors of logical storage units is provided. Note then descriptors may be compared entirely or partially (for example, only file names, time stamps of file modification and physical addresses of files' clusters may be compared). In another embodiment, a procedure for comparing descriptors or portions of descriptors part may be implemented by calculating hash values for descriptors or their parts and comparing calculated hash values. If the answer is yes, i.e. descriptors are coincident, then in step 235 physical storage units of the logical storage units are unmarked in the bitmap, and further do not considered as a subject of incremental backup. If the answer is no, i.e. descriptor of logical storage unit was changed since previous backup, then corresponding physical storage units may be subject of the incremental backup. Then the process goes to step 235 to check if there are logical storage units being unexamined. If there are unexamined logical storage units, the next record pointer is set in step 250, and the process then proceeds back to step 220. If all the logical storage units from the selected area are examined, bit map updating is finished (step 240).

Some physical storage units outside the selected area may be archived without additional checking. Such units may be blocks or clusters of the MFT, blocks with partition information, blocks of files indicated in the log file described above, etc.

Additionally, it should be noted that after a defragmentation of the hard drive (or some other movement or relocation of the data blocks that does not affect their contents), the descriptors are changed to ensure that the new location of the data block is properly reflected in the corresponding descriptors and/or the bitmap. Therefore, movement of blocks may be properly analyzed during the update of the bitmap even if content of the file itself does not change.

Figure 3:
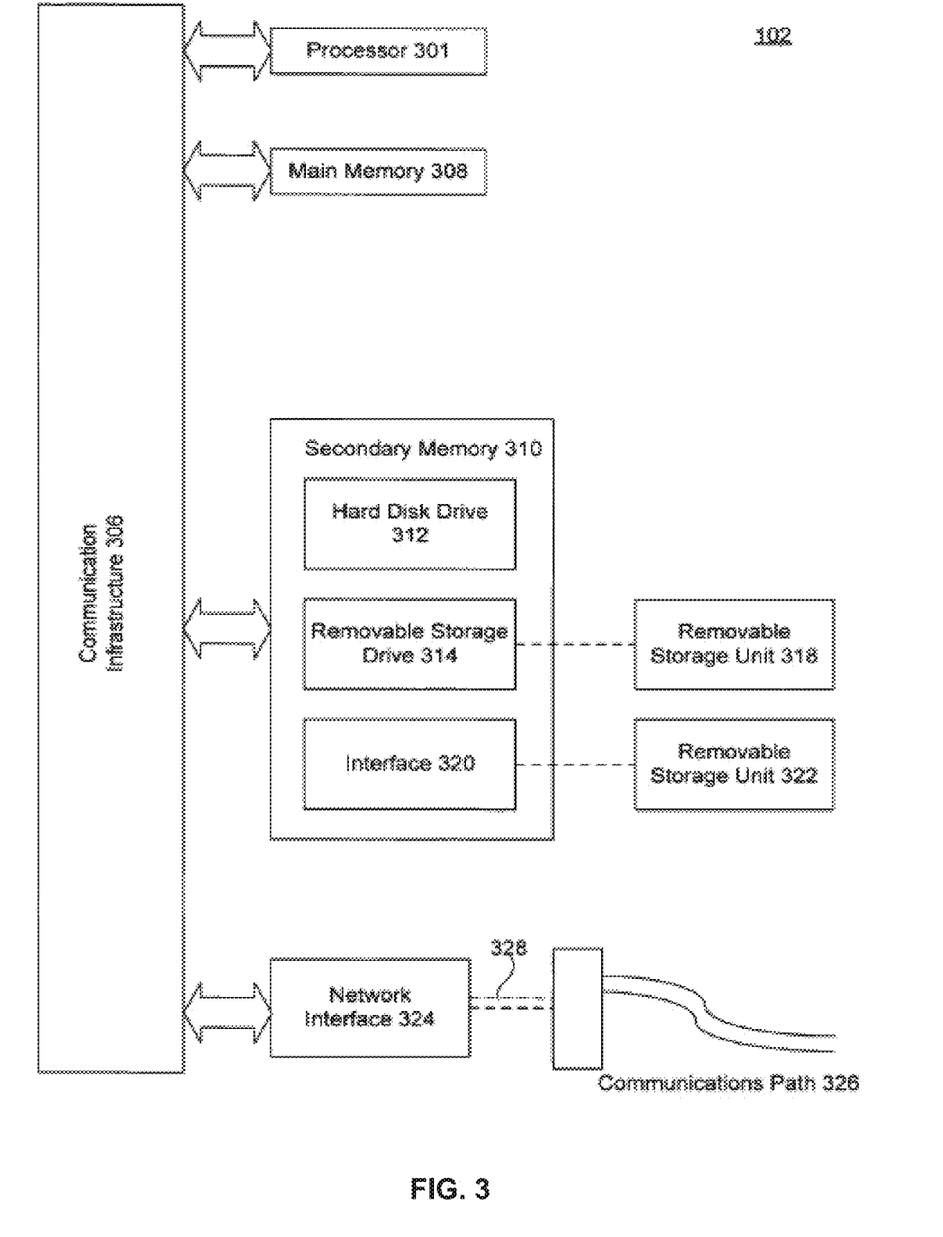
FIG. 3 is a schematic diagram of an example computer or server that can be used in the invention.

An example of the computer 102 is illustrated in FIG. 3. The computer 102 includes one or more processors, such as processor 301. The processor 301 is connected to a communication infrastructure 306, such as a bus or network). Various software implementations are described in terms of this example computer system. After reading this description, it will become apparent to a person skilled in the relevant art how to implement the invention using other computer systems and/or computer architectures.

Computer 102 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is read by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into computer 102. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to computer 102.

Computer 102 may also include one or more communications interfaces, such as communications interface 324. Communications interface 324 allows software and data to be transferred between computer 102 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the computer 102.

Computer programs are stored in main memory 308 and/or secondary memory 310. Computer programs may also be received via communications interface 324. Such computer programs, when executed, enable the computer 102 to implement the present invention as discussed herein. In particular, the computer programs, when executed, enable the processor 301 to implement the present invention. Where the invention is implemented using software, the software may be stored in a computer program product and loaded into computer 102 using removable storage drive 314, hard drive 312 or communications interface 324.

Figure 4:
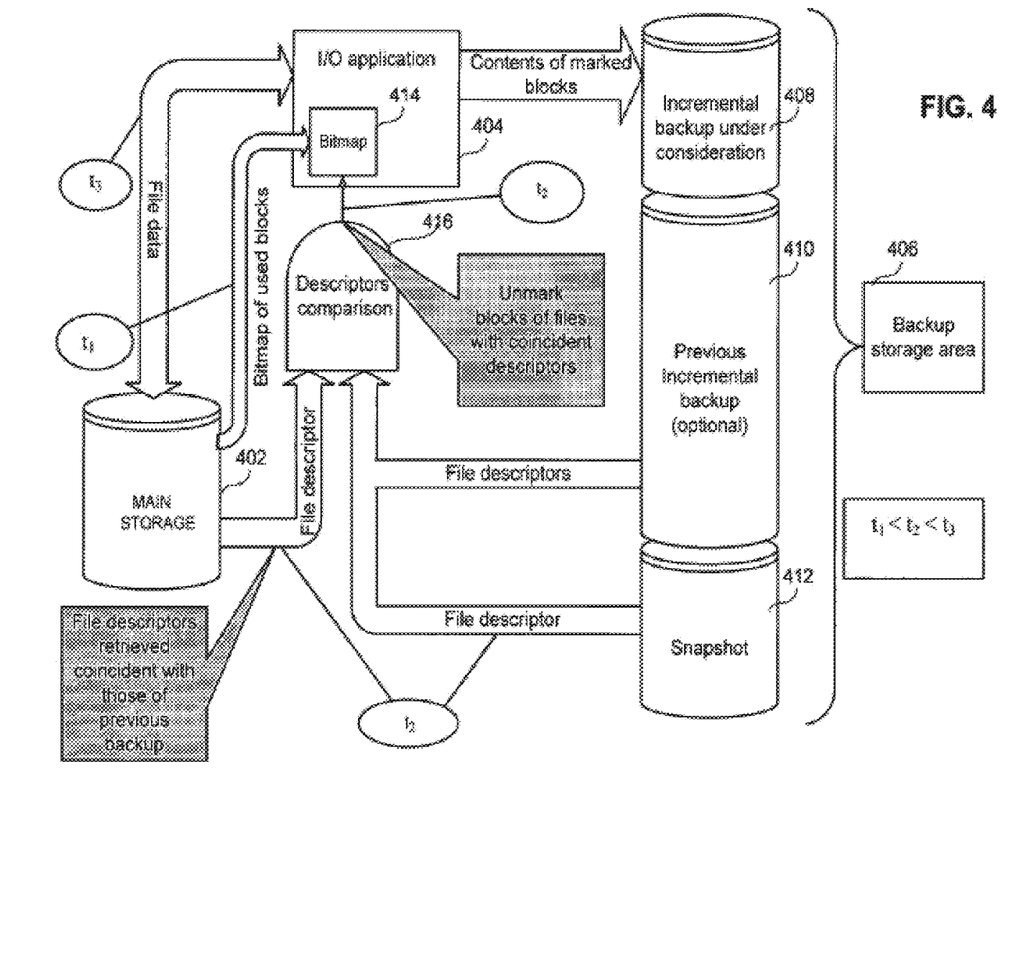
FIG. 4 is a schematic diagram of storage structures treatment according to one embodiment of the invention.

FIG. 4 illustrates a system block diagram of one embodiment of the invention. As shown in FIG. 4, a main storage 402 interfaces with an I/O application 414 for the purpose of backing up file data. The I/O application 404 maintains a bitmap 414, as discussed above, which keeps track of selected area of the disk, e.g. used blocks (i.e., blocks that contain useful data), or blocks of logical units that area not reflected in a log of changes. The latter may stay out of consideration, since it should be backed up in any way. A backed up data storage area 406 consists of at least a snapshot 412, a previous incremental backup 410, and the backup currently under consideration (408), based on the contents of the marked blocks. At time t.sub.1 the bitmap is maintained based on the state of the main storage 402 then, at time t.sub.2 the descriptors are compared (416) and after updating bitmap, at time t.sub.3 content of marked physical storage units is transferred to incremental backup storage 408.

Various embodiments are directed to systems and methods for creating incremental file-level archives from a hard disk drive or other suitable volume. A file-level archive typically does not include copies of all data blocks at the volume but instead includes copies of a set of selected files or other logical storage units (e.g., folders, etc.). Files making up a file-level archive may, but need not be stored on a single or common volume.

Incremental file-level archives may be created by monitoring clear or hashed file descriptors associated with the set of files. File descriptors may be any information describing a file. For example, timestamp descriptors may be timestamps indicating when a file has been created, modified, and/or accessed. Location descriptors may map the file to physical data units where the file is stored or intermediate abstractions thereof. In some examples, file descriptors are maintained by the file system for example, in a log file such as the NTFS MFT described above with respect to FIG. 5.

In various examples, an archive of a set of files is created. The archive may include file descriptors, for example, at least one descriptor for each file in the set of files. The descriptors may be hashed or clear. Each descriptor or hashed descriptor may be associated with an indicator of the file that it describes, such as an inode, file ID, etc. When the descriptors are hashed, a single hash may represent one descriptor or multiple descriptors. For example, descriptors of the same file may be individually hashed to create multiple hashed descriptors for the file. In some examples, all or a portion of the descriptors of a file may be hashed together to generate a single hashed descriptor. For example, some or all timestamp descriptors for a file may hashed together and some or all location descriptors for a file may be hashed together. Also, some or all of the files may be described by only a single descriptor or hashed version stored as a part of the archive.

A subsequent archive may be created by examining current versions of the descriptors (or hashed versions thereof). Current versions of the descriptors may be compared to archived versions of the descriptors that are part of a reference archive. The reference archive may be the most recent archive created or any suitable reference archive. If the current descriptors (or hashed versions thereof) for a file in the set of files match the archived descriptors, it may indicate that the file has not changed and need not be included in the subsequent archive. On the other hand, if the current descriptors do not match, it may indicate that the file has changed since the time of the reference archive and should be part of the subsequent archive. Although various embodiments are described in the context of file-level archives, the systems and methods herein may be practiced for archives of sets of any type of logical storage units such as, for example, folders, directories, volumes, etc.

Figure 6:
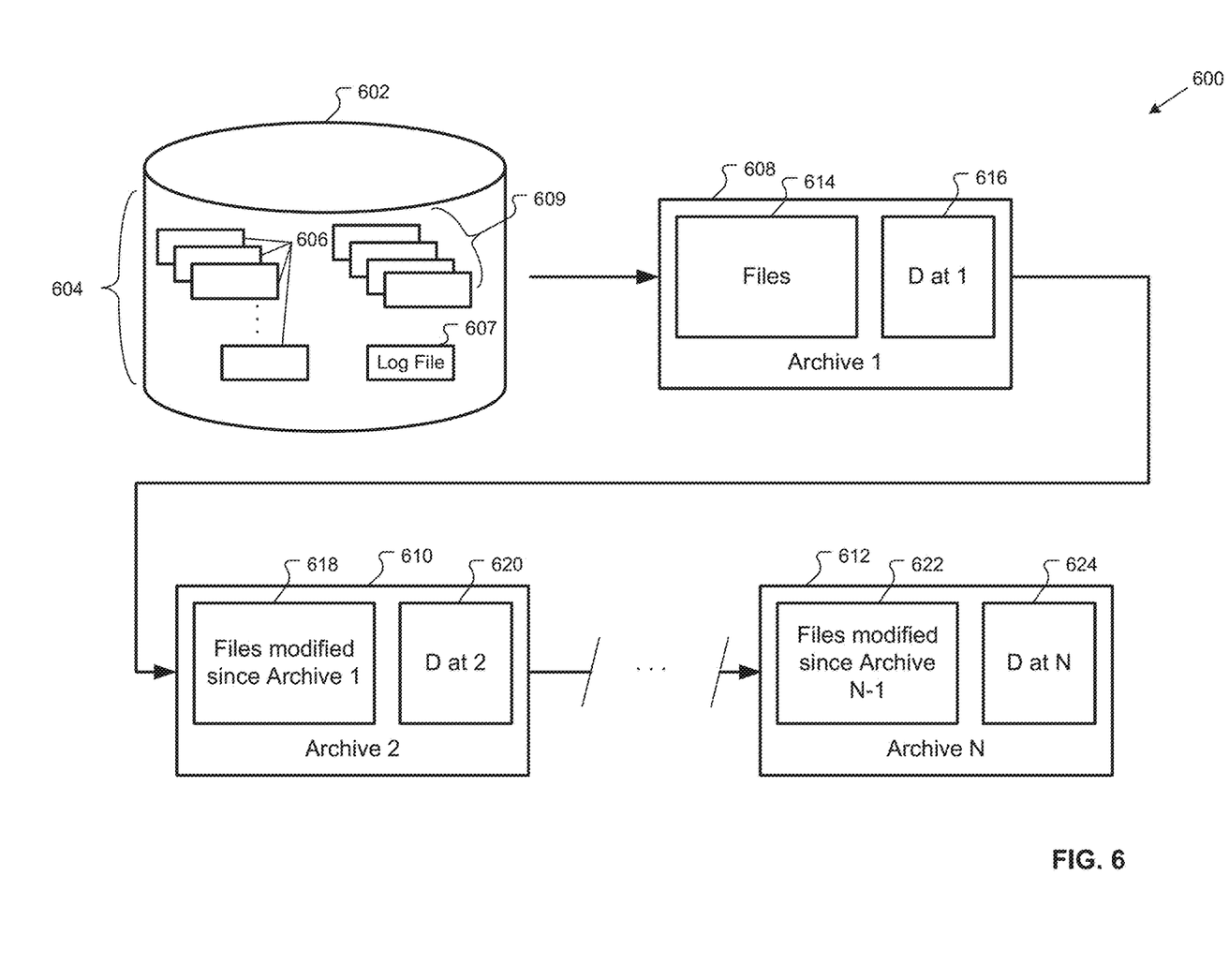
FIG. 6 is a schematic diagram illustrating one example for creating incremental file-level archives.

FIG. 6 is a schematic diagram illustrating one example environment 600 for creating incremental file-level archives. The environment 600 comprises a volume 602 that stores files 604. The files 604 comprise a set of files 606 for file-level archiving and a log file 607. The log file 607 may comprise metadata describing the various files 604 included on the volume 602. FIG. 6 also shows optional additional files 609 that are part of the files 604 stored at the volume 602 but are not part of the set of files 606 for file-level archiving.

The environment 600 also shows a first archive 608 of the set of files 606. The first archive 608 may be created, for example, as described herein and with respect to FIG. 7 below. The first archive 608 comprises a file portion 614 that may include copies of all of the files 606. A descriptor portion 616 may comprise descriptors of the files 606. At the descriptor portion 616, each file descriptor may be associated with at least one file 606 and each file 606 may have at least one descriptor at the descriptor portion 616. The descriptors at the descriptor portion 616 may be in the clear and/or hashed. Descriptors at the descriptor portion 616 may describe the files 606 at the time that the first archive 608 was created, for example, at the time that a snapshot used to generate the archive 608 was taken.

A second archive 610 may be taken after the first archive 608. For example, as illustrated, the first archive 608 is the reference archive for the second archive 610. The second archive 610 may comprise a file portion 618 that comprises copies of, at least, any of the files 606 that have changed since the time that the first archive 608 was created. The second archive 610 may also comprise a descriptor portion 620. The descriptor portion 620 may comprise descriptors for all of the files 606 at the time that the second archive 610 is created. Additional archives may be created in a similar manner, as indicated by the Nth archive 612. The Nth archive 612 comprises a file section 622 comprising files that have changed since the creation of a reference archive for the Nth archive 612. In an incremental scheme, the reference archive may be the N−1 archive (not shown in FIG. 6). Descriptor portion 624 may comprise descriptors of the files 606 at the time that the Nth archive 612 was created.

Figure 7:
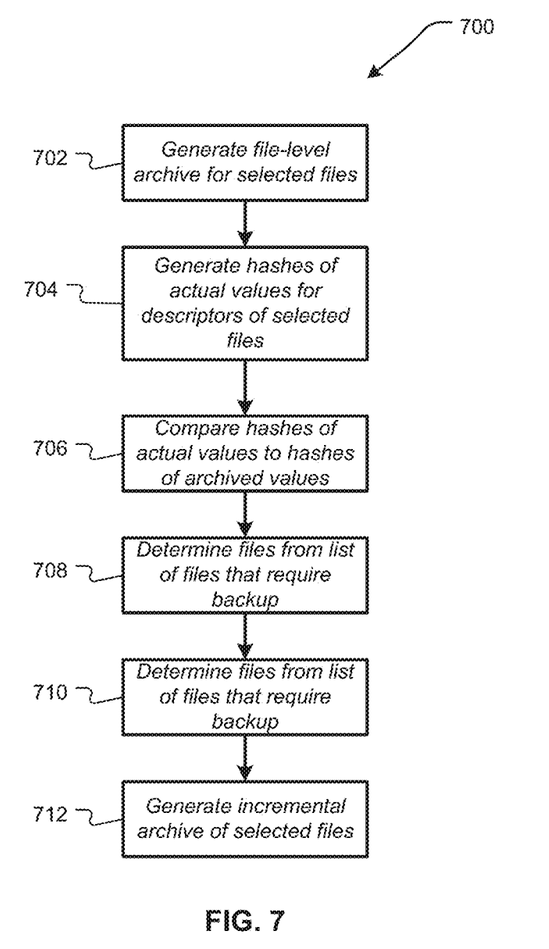
FIG. 7 illustrates one general example process for creating file-level archives.

FIG. 7 illustrates one general example process 700 for creating file-level archives. At 702, a file-level archive is created for a set of files 606. The archive may comprise a copy of all or a portion of a set of files 606. If the archive is a first archive of the set of files, it may comprise copies of all files 606 making up the set. In this way, an initial backup of each file from the selected storage medium may be created by adding a copy of each file to the first archive. If the archive is made relative to a previous reference archive, it may include only those files that have been modified since the time that the reference archive was created. The archive may comprise a descriptor portion, similar to those described above, including descriptors of the set of files 606 at the time that the archive was made. The descriptors may be hashed, as described herein.

The method 700 may proceed when it is desirable to create a subsequent archive. The subsequent archive may use the archive generated at 702 as a reference archive. For example, at 704 actual (e.g, current) values for descriptors describing the files 606 may be retrieved and hashed. In some examples, the descriptors are retrieved from a log file 607 maintained by a file system for the volume. At 706, the hashed descriptors may be compared to the hashed descriptors stored at the reference archive. At 708, a list of changed files is created. For example, if an actual hashed descriptor for a file 606 does not match the reference hashed descriptor stored at the reference archive, this may indicate that the file has changed since the time that the reference archive was created. The file 606 may be added to a list of changed files or files that require backup.

Optionally at 710, files 606 included in the list of changed files may be examined to verify whether they have changed since the time that the reference archive was created. For example, each physical storage unit including data from the files 606 on the list may be compared to a corresponding physical storage unit at the reference archive. In some examples, this action may be performed only for a subset of files 606 determined to be changed. For example, only files that have been both changed and moved, as described herein with respect to FIG. 8. In another example, metadata records may be read where each record corresponds to one of the files from a subset of files. Hashes of those metadata records may be compared with hashes of metadata records corresponding to files in an initial archive to determine which files have been changed or are new.

At 712, the subsequent archive of the set of files 606 may be created. The subsequent archive may comprise a file portion including data units making up any of the files 606 that are determined to have changed since the time that the reference archive was created. In this way, files that have changed or are new may be backed up. These may be copied from the volume 602. The subsequent archive may also comprise hashed versions of descriptors for the files 606 at the time that the incremental archive is created. For example, hashed versions of the file descriptors found at 704 may be written to the subsequent archive. Although the process flow 700 is described as including hashed descriptors, some embodiments may utilize descriptors stored and processed in the clear. In an embodiment, after new files are added to the archive, a list of hashes in the archive may be updated.

In some examples, the process 700 may be configured to discern files 606 that have changed locations at the volume 604 but have not been otherwise modified. For example, if a physical storage device containing the volume 604 is defragmented or defragged, some or all of the data blocks making up the files 606 will be moved. If this is not accounted for, the next incremental archive created may contain all of the files, which increases the resources and time necessary for its creation. To address this problem, in some examples, the descriptor portion of the various archives may comprise, for each file 606, at least one timestamp hash and at least one location hash. The timestamp hash may be a hash of at least one descriptor of a file timestamp (e.g., an entry modified timestamp, a creation timestamp, an access timestamp, etc). The location hash may be a hash of at least one descriptor of a physical or abstracted location of the file 606 such as one or more of a virtual cluster number (VCN), a logical cluster number (LCN), etc.

Figure 8:
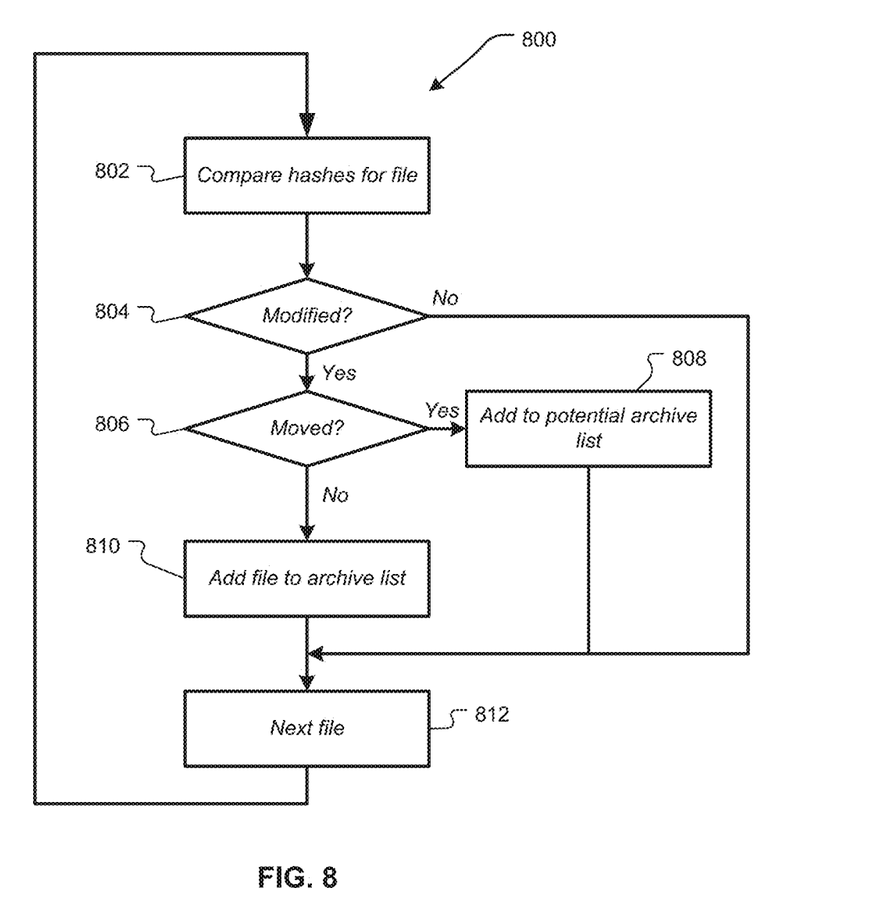
FIG. 8 illustrates one general example process for comparing hashed file descriptors to account for moved files.

FIG. 8 illustrates one general example process 800 for comparing hashed file descriptors to account for moved files. For example, the process 800 demonstrates one way that the action 706 of the process 700 may be performed. At 802, actual and archived hashed descriptors for a first file 606 may be compared. Actual hashed descriptors may be found, as described herein, based on a current state of the files 606 at the volume 602. The archived hashed descriptors may be retrieved from a reference archive, also as described herein. The comparison at 802 may indicate whether the file 606 has been modified and whether the file 606 has been moved. For example, if the actual and archived values for one or more timestamp hashes do not match, it may indicate that the file has been modified. If the actual and archived values for one or more location hashes do not match, it may indicate that the first file 606 has moved. At 804, if the comparison indicates that the first file 606 has not been modified, then the process 800 may move to the next file at 808. If, at 804, the comparison indicates that the first file 606 has been modified, the process 800 may proceed to 806. If, at 806, it is determined that the first file 606 has moved, then the first file 606 may be added to a potential archive list 808. For example, if the first file 606 has moved, the difference between the actual and archived timestamp hashes may not reflect any actual changes in the first file 606 but may instead indicate the move.

If, at 806, it is determined that the first file did not move, then the first file 606 may be added to an archive list at 810. For example, if the first file 606 has been modified but has not moved, the modification likely indicates a change to the first file 606. If the first file 606 is added to the archive list at 810 or the potential archive list at 808, the process 800 may increment to the next file 606 from the set of files for file-level archiving at 812 and continue to evaluate until all of the files 606 in the set of files are considered. In some examples, files that are listed on the potential archive list are subjected to further analysis to determine whether those files have actually changed since the time of the reference archive. For example, a data block-by-data block comparison may be performed to determine if any data blocks making up the file 606 have been modified or simply moved. If a modification to the file is detected, it may be added to the archive list. The subsequent archive may be created to include the files on the archive list.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for creating a logical storage unit-level archive of a set of logical storage units stored on at least one storage medium, the set of logical storage units (LSUs) comprising a plurality of LSUs, the method comprising:
generating, by a processor in communication with the at least one storage medium, a first plurality of LSU descriptors, wherein each LSU descriptor from the first plurality of LSU descriptors describes a current version of one of the set of LSUs at about the time of the generating, wherein the first plurality of LSU descriptors comprises, for each LSU from the set of LSUs, a location descriptor and a timestamp descriptor;
reading, by the processor, from a first archive of the set of LSUs, a first archive plurality of LSU descriptors, wherein each of the first archive plurality of LSU descriptors describes a version of one of the set of LSUs when the first archive was created;
comparing, by the processor, the first archive plurality of LSU descriptors with the first plurality of LSU descriptors;
identifying, by the processor, a first LSU from the set of LSUs that has an associated LSU descriptor from the first plurality of LSU descriptors that does not match a corresponding LSU descriptor from the first archive plurality of LSU descriptors;
generating, by the processor, a second archive of the set of LSUs, wherein the second archive comprises the first file and the first plurality of LSU descriptors;
determining that a timestamp descriptor for a second LSU at the first plurality of LSU descriptors does not match a corresponding timestamp descriptor for the second LSU at the first archive plurality of LSU descriptors;
determining that a location descriptor for the second LSU at the first plurality of LSU descriptors does not match a corresponding location descriptor for the second LSU at the first archive plurality of LSU descriptors;
determining that the second LSU has not changed since when the first archive was created; and
omitting the second LSU from the second archive of the set of LSU.

2. The method of claim 1, wherein the first archive plurality of LSU descriptors are hashed and the first plurality of LSU descriptors are hashed.

3. The method of claim 1, wherein the first archive plurality of LSU descriptors and the first plurality of LSU descriptors each comprise at least one timestamp descriptor and at least one location descriptor.

4. The method of claim 3, wherein the hashed timestamp descriptor comprises a hashed version of a timestamp for an LSU operation associated with the timestamp, wherein the LSU operation is selected from the group consisting of: creating the LSU; modifying the LSU; accessing the LSU; and modifying a descriptor of the LSU.

5. The method of claim 1, wherein generating the first plurality of LSU descriptors comprises receiving a first LSU descriptor from an entry for the first LSU, the entry at a log file maintained by a file system for the at least one storage medium.

6. The method of claim 1, wherein generating the second archive of the set of LSUs comprises writing to the second archive the first plurality of LSU descriptors and, for each of the first plurality of LSU descriptors, an associated indicator of an LSU from the set of LSUs that is described by the LSU descriptor.

7. The method of claim 1, further comprising examining, by the processor, the first LSU to verify whether the first LSU has changed since when the first archive was created.

8. The method of claim 1, wherein the LSUs from the set of LSUs are selected from the group consisting of a folder and a file.

9. A method for creating a logical storage unit-level archive of a set of logical storage units stored on at least one storage medium, the set of logical storage units (LSUs) comprising a plurality of LSUs, the method comprising:
generating, by a processor in communication with the at least one storage medium, a first plurality of LSU descriptors, wherein each LSU descriptor from the first plurality of LSU descriptors describes a current version of one of the set of LSUs at about the time of the generating;
reading, by the processor, from a first archive of the set of LSUs, a first archive plurality of LSU descriptors, wherein each of the first archive plurality of LSU descriptors describes a version of one of the set of LSUs when the first archive was created;
comparing, by the processor, the first archive plurality of LSU descriptors with the first plurality of LSU descriptors;
identifying, by the processor, a first LSU from the set of LSUs that has an associated LSU descriptor from the first plurality of LSU descriptors that does not match a corresponding LSU descriptor from the first archive plurality of LSU descriptors; and
generating, by the processor, a second archive of the set of LSUs, wherein the second archive comprises the first file and the first plurality of LSU descriptors; and
after generating the second archive of the set of LSUs, generating, by the processor, a third plurality of LSU descriptors, wherein each LSU descriptor of the third plurality of LSU descriptors describes a version of one of the set of LSUs at about the time of the generating;
reading, by the processor, the first plurality of LSU descriptors from the second archive;
comparing, by the processor, the third plurality of LSU descriptors to the first plurality of LSU descriptors;
identifying, by the processor, a second LSU from the set of LSUs that has an associated LSU descriptor from the first plurality of LSU descriptors that does not match a corresponding LSU descriptor from the third plurality of LSU descriptors; and
generating, by the processor, a third archive of the set of LSUs, wherein the third archive comprises the second file and the third plurality of LSU descriptors.

* * * * *